Figure 1:
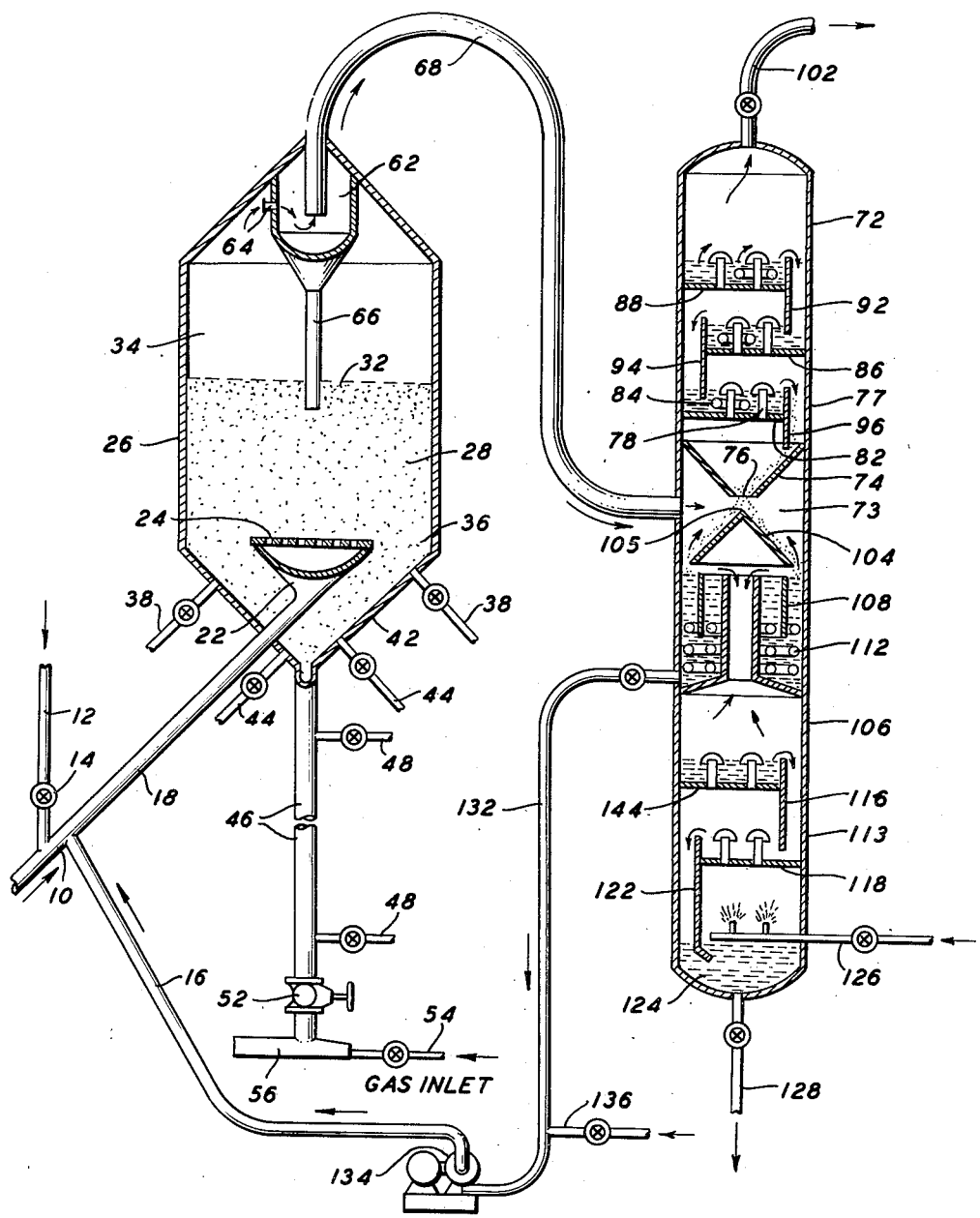

INVENTOR
MARION W. BOYER
BY George J. Silhavy
ATTORNEY

INVENTOR
MARION W. BOYER
BY George J Silhavy
ATTORNEY

Patented Feb. 13, 1951

2,541,635

UNITED STATES PATENT OFFICE 2,541,635

RECOVERING CATALYST IN OIL VAPORS

Marion W. Boyer, Baton Rouge, La., assignor to Standard Oil Development Company, a corporation of Delaware Application September 28, 1946, Serial No. 700,027

2 Claims. (Cl. 196—52)

This invention relates to contacting solid particles with gaseous fluids, and more particularly, relates to catalytic reactions in which finely divided or powdered catalyst is used and in which some of the catalyst particles are carried over with the gaseous reaction products and are recovered in the condensed products as a slurry.

In the catalytic conversion of hydrocarbons using finely divided catalyst, the oil to be converted is contacted with the catalyst and vaporous reaction products leaving the conversion zone are passed through gas-solid separating devices to remove the bulk of the finely divided catalyst in a dry separation step. However, the vaporous reaction products contain entrained catalyst after passing through the separation devices, and it is necessary to recover the entrained catalyst. The vaporous reaction products are passed to a fractionating tower for separating the reaction products into the desired fractions.

The entrained catalyst is collected in the bottom of the fractionating tower as a slurry in the heavy oil bottoms condensed in the fractionating tower. In earlier operations, this heavy oil condensate was recycled with the catalyst to the conversion zone. However, this heavy oil condensate is a poor cracking stock because it contains heavy polymers formed as a result of the cracking step, and when recycled to the conversion zone, causes increased deposition of coke or carbonaceous material on the catalyst without producing desired products in sufficient amounts to warrant such rapid deactivation of the catalyst. Also because of the heavy nature of the recycle oil, poorer stripping is obtained.

Various alternatives have been tried to recover and return the entrained catalyst to the conversion zone without returning the heavy condensate oil but such methods are relatively expensive in that they require additional equipment.

According to my invention, the entrained catalyst is collected in a heavy hydrocarbon oil in which the heavy polymers are diluted. One part of the heavy fraction is settled to a higher concentration of catalyst and recycled to the conversion zone. Another part of the heavy fraction substantially free of entrained catalyst and either further fractionated or not is withdrawn from the system and discarded or used for other purposes but is not recycled to the conversion zone because it contains the bulk of the undesirable heavy polymers.

In one form of my invention, entrained catalyst is collected in a settling zone in a wide cut heavy oil in a fractionating tower to form a slurry, the mixture is permitted to settle to form a more concentrated slurry and the more concentrated slurry with or without dilution with fresh feed is recycled to the conversion zone. This wide cut oil contains lighter constituents than the heavy bottoms above mentioned and these are more easily stripped from the catalyst particles than the said heavy bottoms. A heavy oil substantially free of catalyst is withdrawn from the bottom of the fractionating tower and discarded.

In another form of my invention, the entrained catalyst in a wide cut heavy condensate oil is withdrawn from the fractionator and is settled in a settling zone to form a heavy or more concentrated slurry which is returned to the conversion zone. Clarified oil containing the bulk of the heavy polymers and substantially no catalyst is withdrawn from the upper portion of the settling zone and discarded.

Figure 2:
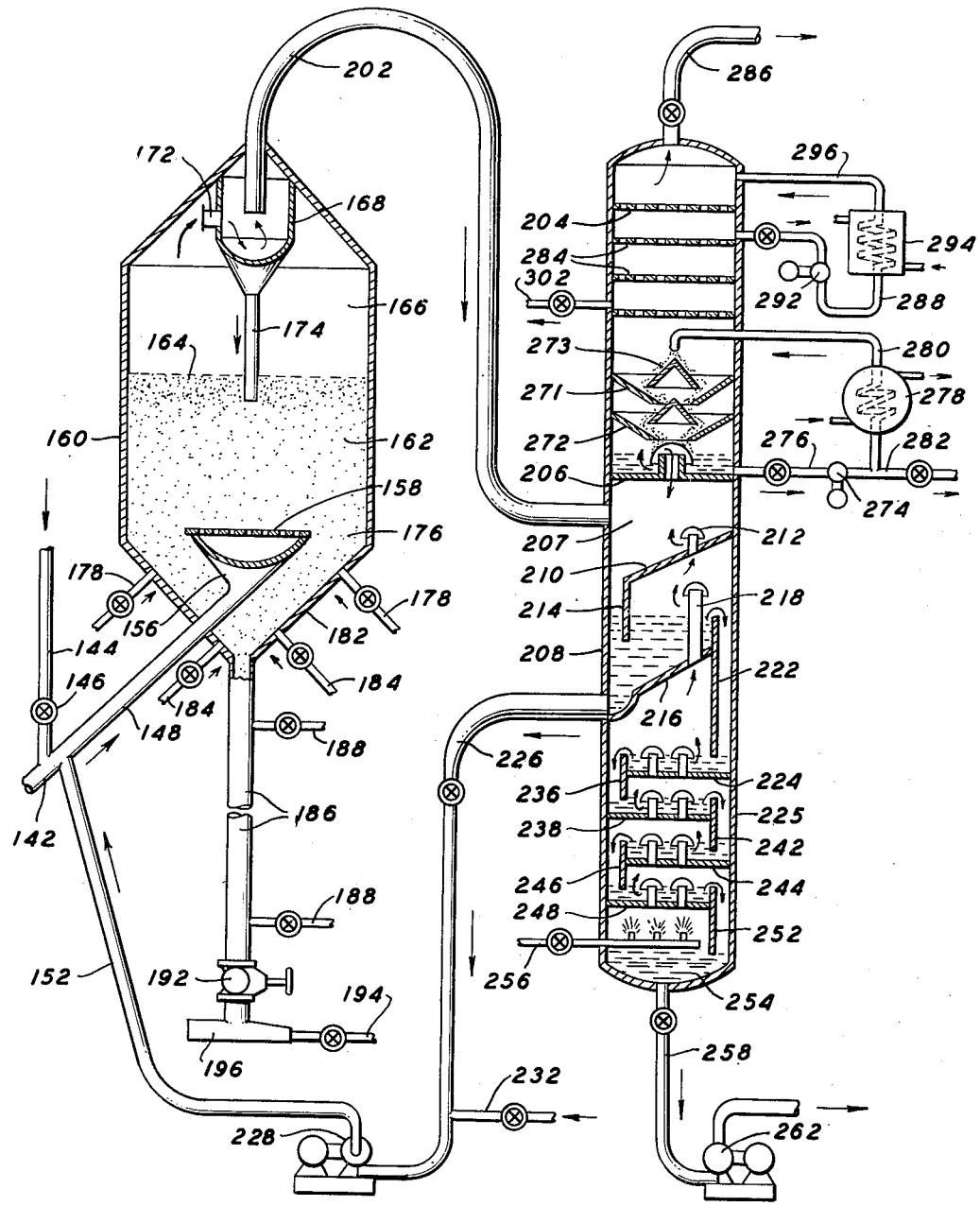

In the drawings:

Fig. 1 represents one form of apparatus which may be used in carrying out my invention; and Fig. 2 represents another form of apparatus which may be used in carrying out my invention.

Referring now to Fig. 1 of the drawing, the reference character 10 designates an inlet line for the reactants which, in the catalytic conversion of hydrocarbons, may comprise heavy gas oil, light gas oil, heavy naphtha, wide cut gas oil, or any other suitable hydrocarbon feed stock. The invention will be particularly described in connection with the catalytic conversion of hydrocarbons, but it is to be understood that my invention may be used in connection with other reactions using finely divided or powdered catalyst.

The feed stock passing through line 10 is mixed with finely divided or powdered catalyst introduced from the bottom of standpipe 12 having a control valve 14. The catalyst is introduced into the upper part of standpipe 12 from a regenerator or from a regenerated catalyst hopper (not shown). The catalyst is substantially at regeneration temperature. The feed stock introduced through line 10 may be vaporized hydrocarbons or the feed stock may be partly preheated hydrocarbons, in which case it is necessary to use a sufficient amount of hot regenerated catalyst to vaporize the liquid constituents of the preheated oil and to supply the heat of conversion or cracking.

The catalyst in a cracking operation may comprise acid-treated bentonite clay, synthetic silica-alumina or synthetic silica-magnesia gels, or any other suitable cracking catalyst. The catalyst is preferably in powdered form having a particle size between about 200 and 400 standard mesh with about 2% to 40% of up to 20 micron particles. The amount of catalyst used may vary between about 0.5 part of catalyst by weight to one of oil by weight to 30 parts of catalyst by weight to one part of oil by weight. The temperature during conversion may be between about 800° F. and 1100° F.

The mixture passing through line 10 is further mixed with a slurry from line 16 which comprises catalyst scrubbed out from the vaporous reaction products as will be hereinafter described in greater detail. The mixture of hydrocarbons and catalyst is passed through line 18 into an inverted conical feed inlet 22 provided with a circular distribution grid member 24 at its upper portion. The conical member 22 and grid member 24 are arranged in the bottom portion of a cylindrical reaction vessel 26. The distribution grid 24 is of a smaller diameter than the interior of the cylindrical reaction zone or vessel 26.

The superficial velocity of the hydrocarbon vapors passing upwardly through the reaction vessel 22 is selected to maintain the particles as a dry, dense, fluidized, liquid-simulating mixture 28 having a level indicated at 32 above which is a dilute phase or dilute suspension which comprises vaporous reaction products containing only a small amount of catalyst particles. In the space 34 the density of the dilute mixture is much less than the density of the dense fluidized mixture 28. The superficial velocity (the velocity in an empty vessel) may vary between about 0.5 foot per second and 2.5 feet per second. The density of the fluidized mixture 28 may vary between about 5 lbs. per cubic foot and 40 lbs. per cubic foot.

During the conversion treatment, coke or hydrogen-containing carbonaceous material is deposited on the catalyst particles. This deposit deactivates the catalyst and it is necessary to regenerate it before reusing it in another conversion operation. The catalyst particles also contain entrained and adsorbed vapors which are preferably removed before passing the catalyst to a regeneration zone. The catalyst particles are withdrawn from the lower portion of the dense fluidized mixture 28 in the reaction vessel 26 and passed down through an annular stripping zone 36 arranged between the distribution grid 24 and the interior wall of the reaction vessel 26. Stripping gas is introduced through one or more lines 38 to pass upwardly through the dense mixture being withdrawn to strip out volatile hydrocarbons. The stripping gas and stripped-out material pass upwardly through the dense bed or mixture 28.

The stripped particles then flow as a dense fluidized mixture into the bottom conical portion 42 of the reaction vessel 26 and are maintained in a fluidized liquid-like condition by the introduction of a fluidizing gas introduced through one or more lines 44 at the bottom portion of the conical bottom 42. The particles flow into a standpipe 46 for developing hydrostatic pressure and they are maintained therein in a fluidized, dense, liquid-like condition by the introduction of a fluidizing gas, such as steam, through spaced lines 48.

The standpipe 46 is provided with a control valve 52 at its lower portion for controlling the rate of withdrawal of catalyst from the standpipe 46. The spent catalyst is then passed to line 54 where it is mixed with a generating gas, such as air or other oxygen-containing gas, to form a less dense suspension and this less dense suspension is passed through line 56 to a regeneration zone or vessel (not shown) wherein the carbonaceous material is removed from the catalyst by burning.

The regeneration zone may be of substantially the same construction as the reaction vessel 26 and the particles during regeneration are maintained in a dense fluidized condition similar to that above described in connection with the reaction vessel 26. The hot regenerated catalyst particles are then passed to the standpipe 12 above described for recycling to the reaction vessel 26.

Returning now to the reaction vessel 26, the vaporous reaction products in the settling zone 34 contain a small amount of entrained catalyst. The bulk of the catalyst is removed by passing the vaporous reaction products into a separating device 62 provided with an inlet 64 and arranged in the upper part of vessel 26. The separating device 62 is shown in the drawing as a cyclone separator but other forms of separating devices may be used, or more than one separator device may be used in series. The separated solid particles collect in the cyclone separator 62 and are withdrawn therefrom through dip pipe 66 for returning the catalyst to the dense bed or mixture 28 below the level 32 thereof.

The vaporous reaction products leaving the separator device 62 through line 68 contain entrained catalyst in an amount about 0.001 lb. to 0.1 lb./cu. ft. of vapors. The vaporous reaction products are passed to an intermediate part of a fractionating tower 72 and into a quenching and scrubbing zone 73. Scrubbing and quenching oil is introduced into the scrubbing zone 73 by means of an inverted cone 74 having a bottom opening 76. The scrubbing oil comprises a heavier condensate separated during the fractionation in the upper part of the fractionating tower 72 as will be presently described.

In the quenching and scrubbing zone 73 the highest boiling hydrocarbon constituents are condensed to form a wide cut fraction and catalyst is scrubbed out of the vapors. The uncondensed lighter hydrocarbons pass upwardly through the opening 76 in the inverted cone 74 to the upper portion of the fractionating tower 72 for further fractionation in fractionating section 77. The vapors pass upwardly through bubble caps 78 in the bubble cap plate or partition 82 wherein they are fractionated by contacting the liquid on the plate 82. If desired, a cooling coil 84 may be provided for cooling the liquid on the plate 82.

The lighter vapors then pass through bubble tower plate 86 and still lighter vapors pass through bubble tower plate 88 arranged one above the other. The liquid from the top plate 88 overflows through downspout 92 to the next lower plate 86. The liquid from plate 86 overflows through downspout 94 to the next lower plate 82. The liquid overflows from the bottom plate 82 through downspout 96 and into the inverted conical member 74 above described. This liquid forms the scrubbing and quenching liquid introduced into the scrubbing zone 73.

A greater number of bubble cap plates may be used than that shown in the drawing. If desired, cooling coils may also be provided for each of the other plates. The desired lightest hydrocarbons comprising gasoline pass overhead from the fractionating tower 72 through line 102 and may be further treated to separate desired constituents. Instead of using the cooling coils on the fractionating plates, cooled reflux may be returned to the upper part of the fractionating tower 72.

Returning now to the quenching and scrubbing zone 73, a conical member 104 is provided below conical member 74 for conducting the relatively heavy wide cut condensate oil and scrubbed out catalyst to a trap-out tray 106 arranged below the conical member 104. Conical member 104 has its apex 105 directly beneath opening 76 in conical member 74. The tray 106 provides a settling zone for permitting settling of the catalyst in the oil to produce a more concentrated oil slurry. If desired, one or more quieting annular baffles 108 may be used in the settling zone. Cooling coils 112 may be provided in the settling zone or tray.

Clarified oil containing substantially no catalyst overflows the top of the settling tray 106 and passes to the lower part of the fractionating tower 72 into stripping section 113 provided with a fractionating plate 114 and a downspout 116 which feeds liquid to a lower fractionating plate 118. The plate 118 is provided with a downspout 122 for conducting the heavy condensate oil to the bottom 124 of the fractionating tower 72.

Stripping gas, such as steam, is introduced through line 126 below the bottom fractionating plate 118. Instead of or in addition to the steam heat may be supplied by other means. The stripping gas passing upwardly through the liquid maintained on plates 118 and 114 strips out lighter constituents which are returned to the scrubbing zone 73 and to the upper part of the fractionating tower 72 above the scrubbing zone. Heavy bottoms oil or clarified oil substantially free of catalyst and containing the bulk of the undesired heavy polymers is withdrawn from the bottom of the fractionating tower 72 through line 128 and discarded.

The relatively heavy slurry collected on the tray 106 is withdrawn from the bottom thereof through line 132 by pump 134 and passed through line 16 above described for returning the catalyst to the reaction vessel 26. If the slurry is too concentrated, fresh oil feed may be introduced into line 132 through line 136 to form a pumpable slurry.

Referring now to Fig. 2 of the drawings, the reaction vessel and associated parts are substantially the same as those shown in Fig. 1 and they will be only briefly described. Inlet line 142 is provided for the feed which is mixed with hot regenerated catalyst from standpipe 144 provided with a control valve 146. The mixture is passed through line 148 with slurry from line 152 to inverted conical feed member 156 provided with a circular distribution grid 158 in the lower part of reaction vessel 160. The powdered catalyst is maintained as a dense fluidized mixture 162 in the reaction vessel 160 and has a level indicated at 164 with a dilute phase or dilute suspension 166 thereabove.

A separating means 168 is provided in the upper part of the reaction vessel 160 and is provided with an inlet 172 for the introduction of vaporous reaction products containing entrained catalyst particles. The separated particles are returned to the dense bed or mixture 162 through dip pipe or dip leg 174.

The spent catalyst particles are passed through an annular stripping zone 176 where they are contacted with an upflowing stripping gas introduced through one or more lines 178. The stripped particles pass into the conical bottom 182 of the reaction vessel 160 wherein they are maintained in a fluidized condition by the introduction of gas through one or more fluidizing lines 184. The fluidized particles flow into standpipe 186 provided with spaced fluidizing lines 188.

The standpipe 186 is provided with a control valve 192 for controlling the rate of withdrawal of catalyst particles into line 196.

Regenerating gas, such as air or other oxygen-containing gas, is introduced through line 194 and forms a less dense mixture or suspension with the spent catalyst particles and this suspension is passed through line 196 to a regeneration zone (not shown) which may be similar in construction to the construction of the reaction vessel 160. From the regeneration zone the regenerated catalyst particles pass to the regenerated catalyst standpipe 144.

The vaporous reaction products leaving the separating device 168 through line 202 contain entrained catalyst particles which are recovered in condensate oil. The vaporous reaction products are introduced into an intermediate portion of the fractionating tower 204 below trap-out tray 206 into a quenching and scrubbing zone 207. The scrubbing oil for the scrubbing zone 207 overflows from the tray 206. In the scrubbing zone the highest boiling constituents of the vaporous reaction products are condensed as a wide cut heavy oil and scrub out catalyst particles from the vapors.

The heavy wide cut condensate oil is collected in settling done 208. The condensed high boiling constituents flow down inclined baffle 210 provided with one or more bubble caps or vents 212 and a downspout 214 for conducting the condensate liquid to the settling zone 208. Downspout 214 also acts as a quieting baffle.

The settling zone 208 is provided with an inclined bottom 216 provided with one or more bubble caps or vents 218. The settling zone 208 is also provided with a downspout 222 for permitting overflow of the clarified oil from the settling zone 208. The heavy clarified oil substantially free of catalyst is passed to a fractionating plate 224 arranged in the stripping section 225 in the lower part of the fractionating tower 204, the fractionating plate being provided with bubble caps. Arranged below the fractionating plate 224 are other fractionating plates presently to be described.

A heavy slurry oil is withdrawn from the bottom of the settling zone 208 through line 226 by pump 228 and the slurry returned to line 148 through line 152 as above described. If the slurry is too concentrated, fresh hydrocarbon feed oil may be introduced into line 226 through line 232 to form a pumpable slurry.

Returning now to the bottom of the fractionating tower 204, the fractionating plate 224 is provided with a downspout 236 which conducts overflow liquid from the plate 224 to the next lower fractionating plate 238. Plate 238 is provided with a downspout 242 for conducting the overflow liquid to the next lower fractionating plate 244. Plate 244 is provided with a downspout 246 for conducting overflow liquid from the plate 244 to the next lower plate 248. Fractionating plate 248 is provided with a downspout 252 for conducting overflow liquid to the bottom 254 of the fractionating tower.

Stripping gas, such as steam, is introduced into the bottom of the tower 204 through line 256 below fractionating plate 248 for passage upwardly through the liquid on the spaced fractionating plates to strip out or vaporize lighter constituents, such as lighter hydrocarbons. This stripped out material passes upwardly through bubble caps or vents 218 and 212 above described for passage into the scrubbing one 207. If the volatile material is low boiling material, it will pass upwardly into the upper part of the fractionating tower 204 for further fractionation. If heavier constituents are included, they will be condensed and returned to the settling zone 208.

Heavy bottoms oil having an API gravity in the range of 0 to 25° and substantially free of catalyst is withdrawn from the bottom of the fractionating tower 204 through line 258 by pump 262 and discarded from the system. This heavy bottoms oil has substantially the same characteristics as the bottoms oil withdrawn through line 128 in Fig. 1.

The lighter constituents which are not condensed in the scrubbing and quenching zone 207 pass upwardly to a cooling zone 271 arranged above the tray 206. The cooling zone 271 is provided with doughnut baffles 272 and disc baffles 273. Condensate oil is withdrawn from tray 206 by pump 274 and passed through line 276 and cooler 278 for cooling the oil. The cooled oil is returned through line 280 to the upper part of the cooling zone 271. Valved line 282 is provided for withdrawing part of the condensate oil from line 276 from the system.

In the cooling zone higher boiling constituents are condensed and this condensate oil collects on trap-out tray 206 and is used as the scrubbing and quenching liquid in the scrubbing and quenching zone 207 above described. The uncondensed vapors pass upwardly through fractionating plates 284 (diagrammatically shown) arranged in the upper part of the fractionating tower 204. Uncondensed vapors containing desired gasoline constituents pass overhead through line 286 from the tower 204 and may be further treated to separate desired fractions.

To provide reflux for the tower 204, a part of the liquid condensate is withdrawn from one of the upper fractionating plates 284 and passed through line 288 by pump 292 and then through a cooler 294 for cooling the oil. The cooled reflux oil is then introduced into the upper part of the fractionating tower 204 through line 296.

If desired, a relatively light condensate oil, such as heating oil, may be withdrawn from the lowermost plate 284 through line 302.

While I have shown bottom draw-off reaction zones in Figs. 1 and 2 it is to be understood that my invention may also be used with upflow reaction zones and upflow regenerators where the gases and/or vapors pass overhead from the respective vessels together with all the catalyst, so that it is necessary to remove more catalyst in the separating devices. However, in such cases there is also entrained catalyst in the vaporous reaction products passing to the fractionating tower.

In earlier operations, the vaporous reaction products containing entrained catalyst were introduced into the bottom portion of the fractionating tower and the highest boiling hydrocarbon constituents were condensed from the vaporous reaction products and formed a slurry with the entrained catalyst. The highest boiling constituent, of the vaporous reaction products were made up of heavy polymers which resulted from the cracking operation. Such heavy polymers are a bad feed stock for a catalytic cracking operation because they deposit large amounts of coke on the catalyst without producing sufficiently large amounts of desired products. One problem has been to recover the catalyst particles without returning the highest boiling constituents containing the heavy polymers to the cracking or conversion zone.

In operations prior to my invention a heavy polymer bottoms oil withdrawn from the bottom of the fractionating tower and containing the entrained catalyst as a slurry for recycling to the reaction zone had about the following characteristics:

*Polymer inspection (heavy polymer bottoms oil)*

| | |
|---|---|
| Gravity, °API | 12.2 |
| Initial boiling point, °F | 535 |
| 30% @ °F | 775 |
| 50% @ °F | 790 |
| 70% @ °F | 815 |
| 90% @ °F | 875 |
| Final boiling point, °F | 955 |
| Catalyst concentration, #/gal | 0.5 |
| Specific dispersion | 238 |

About 5 to 10 volume per cent on feed of this slurry would be recycled to the reaction zone 26.

In such earlier operations, the temperature at the bottom of the fractionating tower was about 650° F.

With my invention and using the same feed stock, the vaporous reaction products are introduced into an intermediate or middle portion of the fractionating tower so that the fractionation of the vaporous reaction products is carried out at a lower temperature than in previous practice. In this way a recycle stock collected on trap-out tray 106 is a lighter fraction than the stock recycled in previous processes.

The settling zone is arranged below the quenching or scrubbing zone and the temperature of the oil in the settling tray 106, for example, in Fig. 1, is about 550–600° F. The heavy oil which overflows from the settling tray 106 contains light constituents and heavy polymers and this condensate oil is subjected to further fractionation and stripping either by steam or other means in the bottom of the tower to recover lighter hydrocarbon constituents from the heavy undesirable polymers. The bulk of the heavy polymers are withdrawn from the bottom of the tower through line 128 and discarded from the system.

The fraction from trap-out tray 106 containing the catalyst as a slurry according to my invention is a stock more suitable for catalytic cracking. The oil withdrawn from the trap-out tray 106 in Fig. 1, or settling tray 216 in Fig. 2 under one set of conditions has the following characteristics:

| | Trap-out Tray, 106 | Fractionator Bottoms, Line 128 |
|---|---|---|
| Gravity, °API | 24.0 | 21.0 |
| Engler Distillation: | | |
| Initial, °F | 515 | 560 |
| 30% @ °F | 620 | 690 |
| 50% @ °F | 660 | 740 |
| 70% @ °F | 710 | 780 |
| 90% @ °F | 770 | 810 |
| Final | 832 | 832 |
| Vol. Per Cent on Feed | [1] 2.5 | [2] 7.5 |

[1] Recycled to Reactor.
[2] Discarded.

The amount of slurry recycled to the reaction zone will vary with the amount of catalyst recovered because in these operations the catalyst content of the slurry controls the amount of slurry oil recycled to the reaction zone. For example, if 15 tons per day of recovered catalyst must be handled in the recycle oil stream and the operable catalyst concentration is about 60 lbs. per barrel maximum, then the recycle oil rate would be at least 500 barrels per day. Fresh feed oil would normally be added to the recycle oil stream to reduce the catalyst concentration to about 21 lbs. per barrel of oil maximum to avoid erosion of the recycle slurry pumps.

In Figs. 1 and 2 I have shown a fractionating tower provided with an integral settling zone for recovering entrained catalyst as a slurry in a condensate oil. While this is the preferred form of my invention, it is to be understood that more broadly, my invention comprises collecting the entrained catalyst in a hydrocarbon fraction which is a better cracking stock than the heavy polymer oil heretofore used as the vehicle for recovering the catalyst to be returned to the conversion zone. The settling zone may be inside of or exterior to the fractionating tower.

Instead of withdrawing the settled slurry oil from an intermediate portion of the fractionating column, it is within the contemplation of my invention to withdraw slurry oil from the bottom and from an upper portion or intermediate portion of the fractionating column. In this case the heavy polymer poor cracking oil with catalyst suspended in it to form a slurry is withdrawn from the bottom of the fractionating column as in previous practice and divided into two substantially equal parts.

One part of the withdrawn slurry is settled to recover a sludge of catalyst and heavy polymer poor cracking oil which is diluted or not with fresh charging oil and recycled in whole or in part to the reaction zone. The other part of the first mentioned withdrawn slurry is recycled to an upper cooler part of the fractionating tower above a trap-out tray wherein the catalyst is recovered as a slurry and is suspended in a lighter hydrocarbon oil fraction in which the heavy polymers are diluted. This lighter slurry is withdrawn from the said trap-out tray in the upper or intermediate part of the fractionating column, settled to recover a sludge of catalyst and oil in which the polymer oil is diluted and the sludge with or without dilution with fresh charging oil stock recycled to the reaction or conversion zone.

In this form of my invention, as in the others, the oil in the slurry has better cracking characteristics than the heavy polymer bottoms oil recovered from the bottom only of the fractionating column.

By using my invention there is a decrease in the amount of coke or carbonaceous material deposited on the catalyst particles than when polymer bottoms oil only is recycled. With my invention the slurry oil containing recovered catalyst in the fractionating tower is a better cracking stock than the heavy polymer bottoms oil recycled to the reactor in operations prior to my invention. The reduction in coke deposition may be about 0.5 to 1.0% based on hydrocarbon feed by weight.

In previous operations, all of the heavy polymer bottoms were returned to the cracking zone with the recovered catalyst as a slurry. With my operation, about 75% by weight of the heavy polymers are discarded from the system through line 128 in Fig. 1 and about 25% or the heavy polymers are retained on settling tray 106 and returned to the conversion zone 26.

While I have described my invention in connection with the catalytic conversion of hydrocarbons, it is to be understood that this is by way of illustration only and that my invention may be used with other catalytic operations wherein it is desired to recover entrained catalyst from vaporous reaction products while recycling the minimum of undesired material, and that modifications and changes may be made without departing from the spirit of my invention.

I claim:

1. In a system wherein hydrocarbons are contacted as vapors with finely divided catalyst in a treating zone and the bulk of the catalyst is removed from vaporous reaction products in a dry separation step and the vaporous reaction products still contain some entrained catalyst, the steps which comprise passing the vaporous reaction products and entrained catalyst to a quenching and scrubbing zone wherein the vaporous reaction products are cooled with a quenching and scrubbing oil to condense the highest boiling constituents in the vaporous reaction products and wash out entrained catalyst, fractionating the uncondensed vapors to separate desired lower boiling hydrocarbons from liquid higher boiling hydrocarbons, passing the last mentioned liquid higher boiling hydrocarbons to said scrubbing and quenching zone, passing said condensed highest boiling constituents and washed-out catalyst to a settling zone to form a more concentrated slurry, withdrawing a slurry from the bottom portion of said settling zone and returning it to the said treating zone and withdrawing clarified oil containing substantially no catalyst from the upper portion of said settling zone, fractionating the clarified oil to remove lighter hydrocarbon constituents from heavy condensate, withdrawing the heavy condensate from the system and returning at least part of the removed lighter hydrocarbon constituents to said scrubbing and quenching zone.

2. In a system according to claim 1 wherein the constituents condensed in the quenching and scrubbing zone form a wide boiling range fraction containing undesirable polymers and desirable cycle stocks, and the heavy condensate withdrawn from the system contains the bulk of the undesirable polymers.

MARION W. BOYER.

REFERENCES CITED

The following references are of record in the file of this patent:

UNITED STATES PATENTS

| Number | Name | Date |
|---|---|---|
| 1,851,550 | Tuttle | Mar. 29, 1932 |
| 2,134,836 | Ostergaard | Nov. 1, 1938 |
| 2,158,425 | Ragatz | May 16, 1939 |
| 2,259,487 | Payne | Oct. 21, 1941 |
| 2,281,282 | Gerhold | Apr. 28, 1942 |
| 2,328,325 | Butikofer | Aug. 31, 1943 |
| 2,398,496 | Edmister et al. | Apr. 16, 1946 |
| 2,411,809 | Rupp et al. | Nov. 26, 1946 |
| 2,440,623 | Voorhees | Apr. 27, 1948 |

OTHER REFERENCES

Murphree et al., "The Improved Fluid Process For Catalytic Cracking," Nat. Pet. News, March 7, 1945, pages R-194, 195, 196, 198, 199, 202, 204 (7 pages).